(12) United States Patent
Zheng

(10) Patent No.: US 11,014,436 B1
(45) Date of Patent: May 25, 2021

(54) LATCH STRUCTURE OF TONNEAU COVER

(71) Applicant: Guangyao Zheng, Cixi (CN)

(72) Inventor: Guangyao Zheng, Cixi (CN)

( * ) Notice: Subject to any disclaimer, the term of this patent is extended or adjusted under 35 U.S.C. 154(b) by 0 days.

(21) Appl. No.: 17/123,149

(22) Filed: Dec. 16, 2020

(30) Foreign Application Priority Data

Aug. 21, 2020 (CN) .......................... 202010851113.8

(51) Int. Cl.
*B60J 7/19* (2006.01)
*B60J 7/16* (2006.01)

(52) U.S. Cl.
CPC ............. *B60J 7/198* (2013.01); *B60J 7/1607* (2013.01)

(58) Field of Classification Search
CPC ................................. B60J 7/198; B60J 7/1607
USPC ........................ 296/100.04, 100.07, 100.16
See application file for complete search history.

(56) References Cited

U.S. PATENT DOCUMENTS

| | | | |
|---|---|---|---|
| 7,258,387 B2 * | 8/2007 | Weldy | ........................ B60J 7/08 296/100.04 |
| 7,628,442 B1 * | 12/2009 | Spencer | .................. B60J 7/104 296/100.04 |
| 9,346,344 B2 * | 5/2016 | Smith | ..................... F16M 13/02 |
| 2006/0208524 A1 * | 9/2006 | Brown | ..................... B60J 7/104 296/100.01 |

* cited by examiner

*Primary Examiner* — Joseph D. Pape
(74) *Attorney, Agent, or Firm* — Kilpatrick Townsend & Stockton LLP

(57) ABSTRACT

A truck cover system includes a rail; a cross bar coupled to the rail, the cross bar comprising: a slide slot passing through opposite side surfaces of the cross bar; a slide channel formed in a bottom surface of the cross bar, wherein the slide channel extends in a lateral direction and intersects the slide slot; and a latching system coupled to the cross bar, wherein the latching system comprises: a slide member passing through the slide slot and is slidable within the slide slot; a saddle member rotatably riding on the slide member, wherein the saddle member comprises at least one leg; a connecting member having a first end and a second end, wherein the first end of the connecting member is rotatably coupled to the leg of the saddle member; and a clamp structure coupled to the second end of the connecting member.

20 Claims, 12 Drawing Sheets

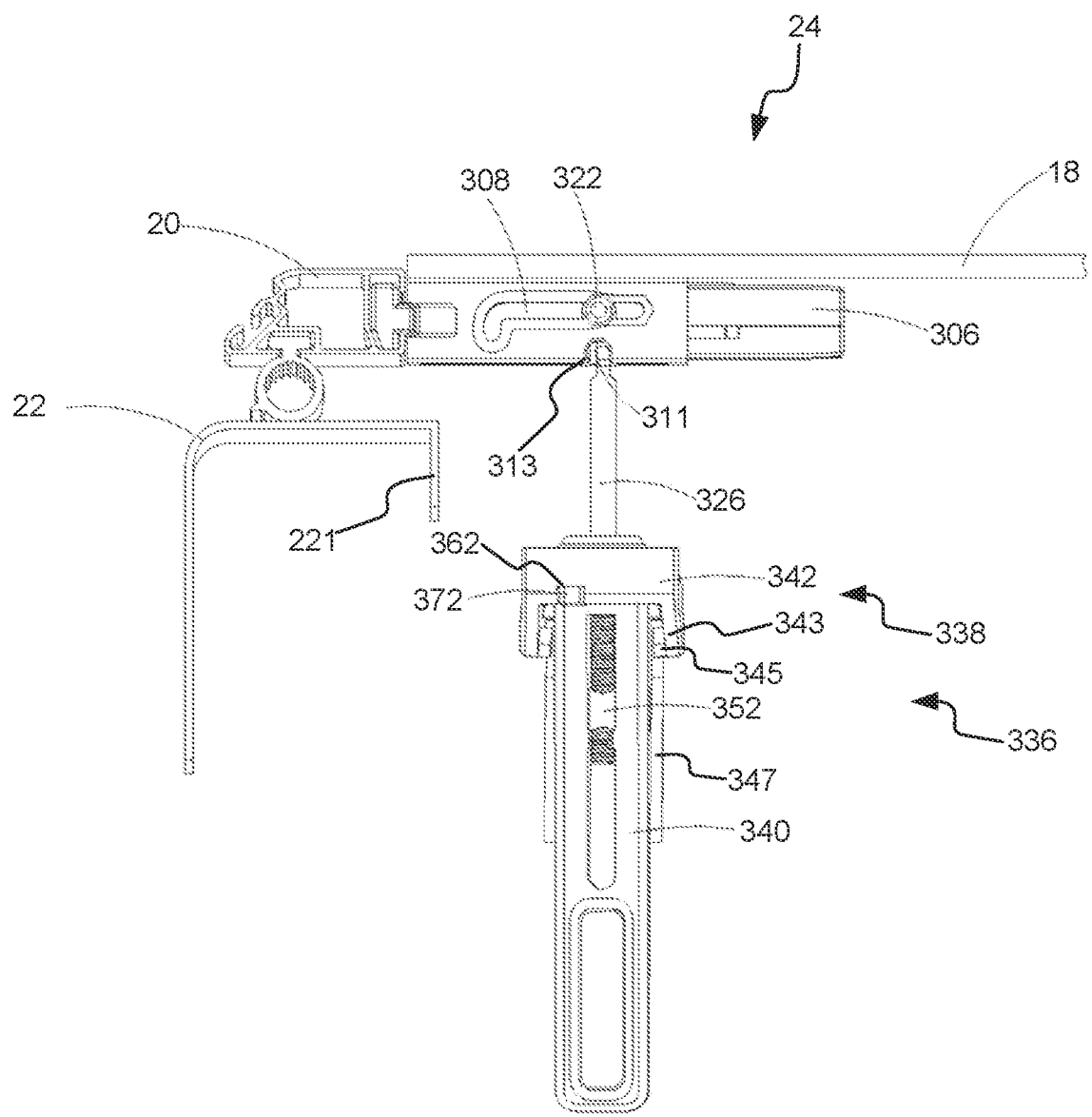
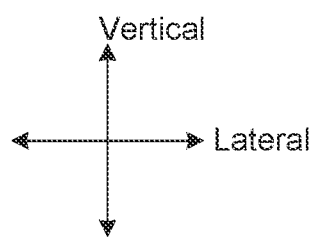
FIG. 6

LATCH STRUCTURE OF TONNEAU COVER

CROSS-REFERENCE TO RELATED APPLICATIONS

This application claims the priority to and benefits of Chinese Patent Application No. 202010851113.8, filed on Aug. 21, 2020, entitled with "Latch Device for Tonneau Cover," and Chinese Patent Application No. 202021765562.2, filed on Aug. 21, 2020, entitled with "Latch Device for Tonneau Cover," which are incorporated herein by reference in their entireties for all purposes.

BACKGROUND OF THE INVENTION

Truck cover systems are often used to protect cargo beds of pickup trucks. Cover systems often cover all or a portion of the cargo bed such that any items stored and/or hauled in the cargo bed are protected from outside elements, as well as theft. Many conventional cover systems are releasably latched at the tailgate to a side rail of the truck to keep the cover in a tensioned configuration. To facilitate access to the cargo bed, the latching structure of the cover system may be easily released. Conventional cover systems involve many inadequacies. Improved cover systems are desired.

BRIEF SUMMARY OF THE INVENTION

A truck cover system is proposed according to some embodiments of the present invention. The truck cover system includes a rail extending in a longitudinal direction, wherein the rail defines a channel configured to couple to a cover; a cross bar extending in a lateral direction that is perpendicular to the longitudinal direction, wherein the cross bar is coupled to the rail, and the cross bar comprises: a slide slot passing through opposite side surfaces of the cross bar and extending along the lateral direction; a slide channel formed in a bottom surface of the cross bar, wherein the slide channel extends along the lateral direction and intersects the slide slot; and a latching system coupled to the cross bar, wherein the latching system comprises: a slide member passing through the slide slot and is slidable within the slide slot; a saddle member rotatably riding on the slide member, wherein the saddle member comprises at least one leg; a connecting member having a first end and a second end, wherein the first end of the connecting member is rotatably coupled to the leg of the saddle member; and a clamp structure coupled to the second end of the connecting member.

According to some embodiments, the slide slot includes a socket recess at one end thereof, wherein the socket recess extends in a vertical direction for a predetermined length.

According to some embodiments, the slide slot comprises a plurality of socket recesses disposed side by side and spaced apart from each other.

According to some embodiments, the cross bar further comprises a rest recess formed in the bottom surface, wherein the rest recess extends along the longitudinal direction and intersects the slide channel.

According to some embodiments, a dimension of a cross-section of the rest recess is configured to equal to or greater than a dimension of a cross-section of the connecting member.

According to some embodiments, the rest recess extends through the cross bar in the longitudinal direction.

According to some embodiments, the cross bar comprises a plurality of rest recesses disposed side by side and spaced apart from each other.

According to some embodiments, the saddle member comprises two legs connected by a connecting portion, wherein free ends of the two legs rotatably coupled to the first end of the connecting member by a bolt.

According to some embodiments, each free end of the two legs comprises a first through hole, and the bolt passes through the through holes.

According to some embodiments, the first end of the connecting member comprises a second through hole, wherein the first end of the connecting member is sandwiched between the free ends of the two legs of the saddle member with the bolt passing through the second through hole.

According to some embodiments, the second end of the connecting member comprises a thread portion coupled to the clamp structure.

According to some embodiments, the clamp structure comprises a clamp and a handle, wherein the clamp comprises a clamp lip coupled to a truck wall lip of a truck wall and a third through hole extending in a vertical direction, wherein the second end of the connecting member passes through the third through hole.

According to some embodiments, the handle comprises two arms spaced apart from each other and defining a hollow inner portion therebetween.

According to some embodiments, each arm of the handle comprises a fourth through hole extending in the longitudinal direction, and the latching system comprises a retaining pin passing through the fourth through holes.

According to some embodiments, the retaining pin comprises a thread hole extending in the vertical direction and receiving the thread portion of the second end of the connecting member.

According to some embodiments, the slide member comprises a bolt and a nut coupled with the bolt.

According to some embodiments, the connecting member comprises a rod.

According to some embodiments, the cross bar comprises a fastening member at one end, a tenon member at the other end, and a bar body between the fastening member and the tenon member, wherein the slide slot is formed in the bar body.

According to some embodiments, the truck cover system further comprises an intermediate member coupled between the rail and the cross bar.

According to some embodiments, the rail comprises a fastening slot formed at one side thereof, and a portion of the intermediate member is retained in the fastening slot.

Numerous benefits are achieved by way of the present invention over conventional techniques. For example, embodiments of the present invention provide a truck cover system comprising a latching system, which may be conveniently stored in a rest position. The latching system occupies a smaller room when it is located in the rest position, and prevents obstruction from accessing the compartment of a truck bed. In some embodiments, the latching system may be configured to nest in a socket recess, which prevents the latching system from unintentional releasing from the latching with the truck wall. In some embodiments, the cross bar may cover the slide member when the slide member slides within the slide slot. Such a structure prevents the cover from interfere with the latching system. In some other embodiments, the latching system may be positioned in multiple socket recesses, which make the latching system accommodate different sizes of the truck bed. These and other embodiments of the invention along with many of its advantages and features are described in more detail in conjunction with the text below and attached figures.

BRIEF DESCRIPTION OF THE DRAWINGS

The accompanying drawings form a part of the present disclosure, that describe exemplary embodiments of the present invention. The drawings together with the specification will explain the principles of the invention. The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 6 is an elevated view of cover system, illustrating latching system be positioned at a released position.

DETAILED DESCRIPTION OF THE INVENTION

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
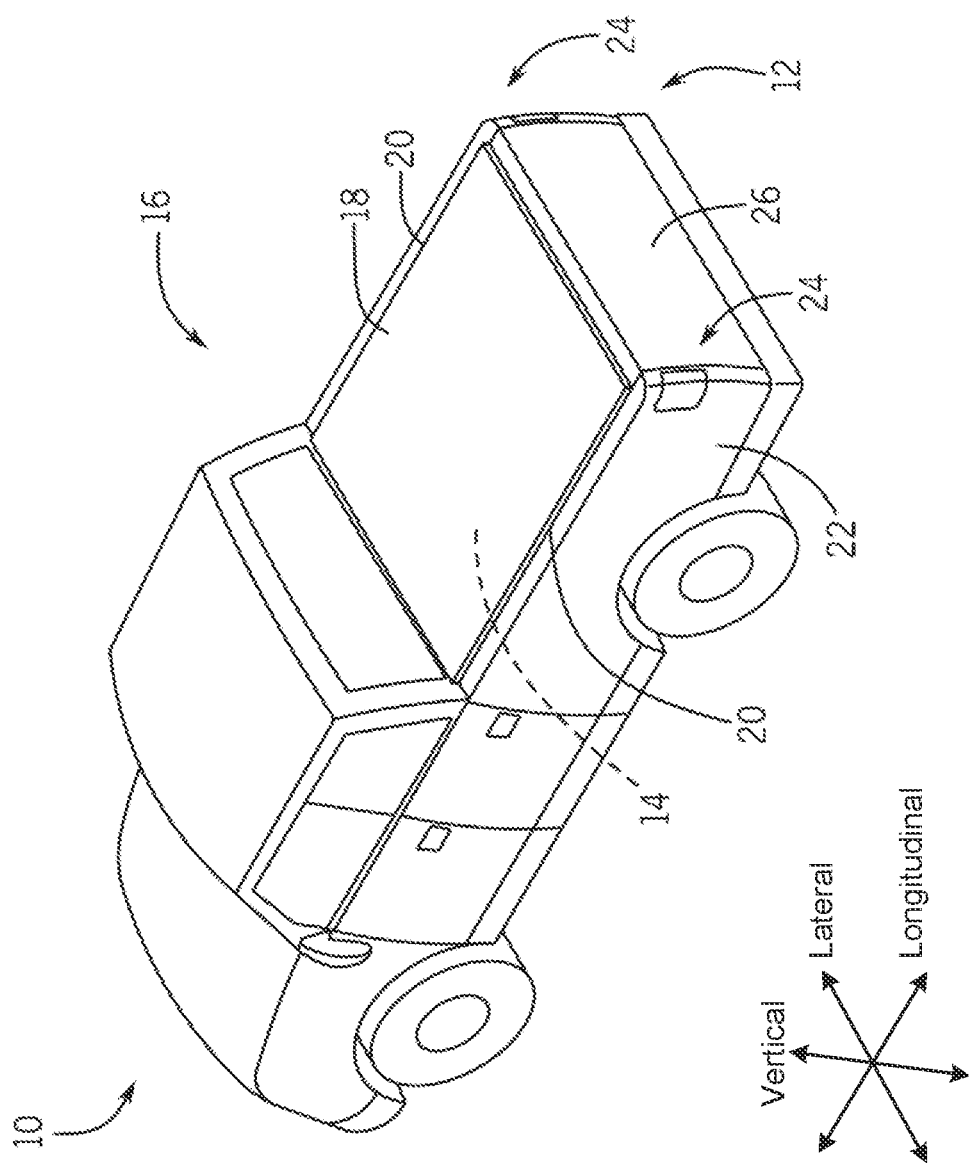
FIG. 1 is a perspective view of an embodiment of a truck with a truck cover system according to some embodiments of the present invention.

FIG. 1 is a perspective view of an embodiment of a truck 10 with a truck cover system 12. As illustrated, the cover system 12 covers the compartment 14 formed by the truck bed 16 to protect an interior of the truck bed 16 and items that may be stored in compartment 14. For example, the cover system 12 may block dirt and precipitation from entering the truck bed 16. The cover system 12 includes a cover 18 (e.g., flexible cover) that extends over the compartment 14. The cover 18 may be made out of a variety of materials including fabric, plastic (e.g., vinyl), etc. The cover 18 couples to the truck bed 16 with rails 20 that in turn couple to truck walls 22 (e.g., truck bed walls). To block removal of the cover 18 and/or access to the truck bed 16, the cover system 12 includes one or more latch systems 24. For example, the cover system 12 may include two latch systems 24 one at each corner of the truck bed 16 next to the tailgate 26. In operation, the latch systems 24 couple to the rails 20 to tension/pull the cover 18 into an extended position (e.g., tensioned configuration) that facilitates the flow of precipitation off of the cover system 12 as well as enhancing the aesthetic appearance of the cover system 12.

Figure 2:
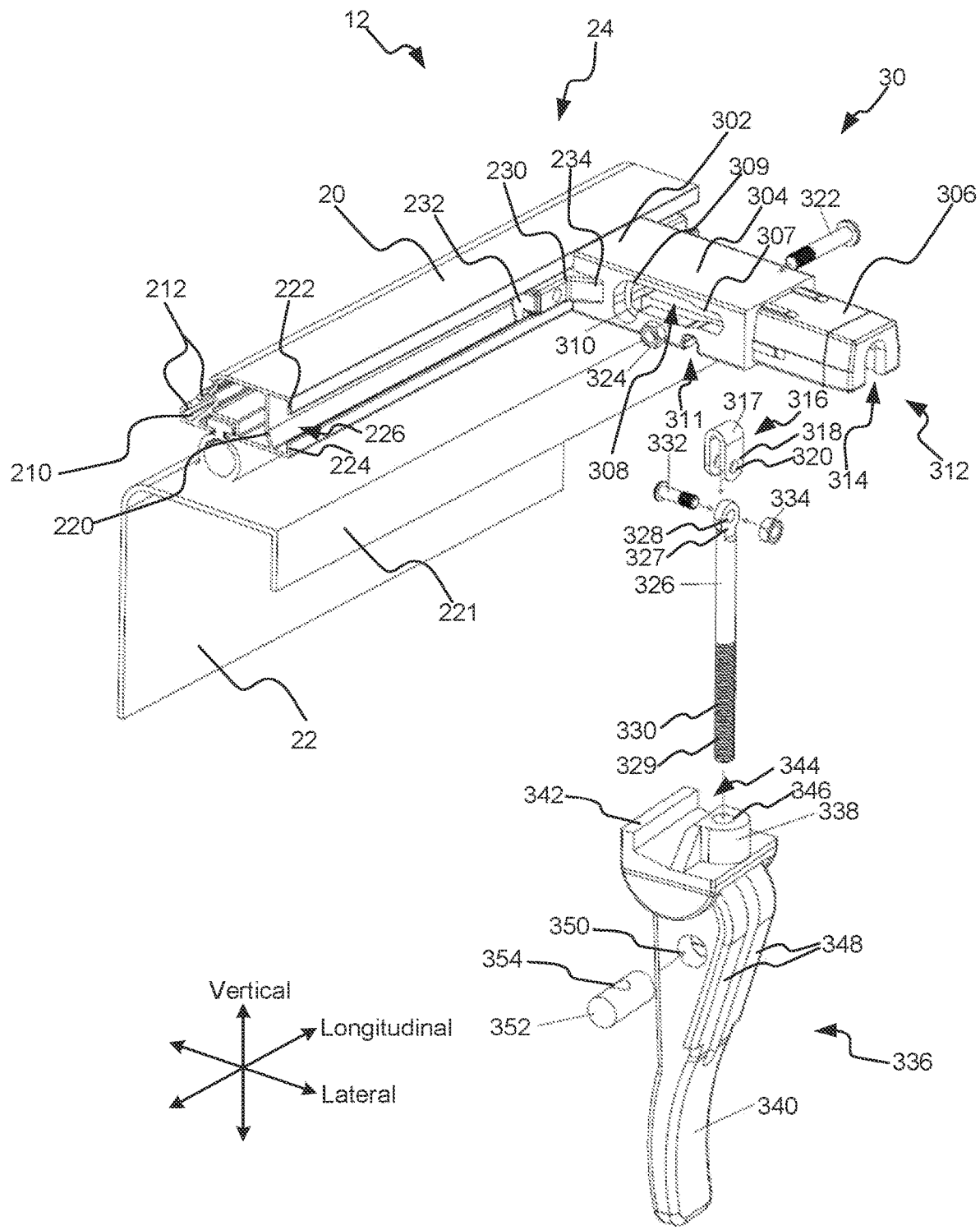
FIG. 2 is a partially exploded perspective view of a cover system according to some embodiments of the present invention.

FIG. 2 is a partially exploded perspective view of a cover system 12 according to some embodiments of the present invention. As shown in FIG. 2, cover system 12 may include rail 20. It should be noted that FIG. 2 shows rail 20 used as the right rail if viewing in the driving direction of the truck. In some embodiments, the left rail of cover system 12 is a mirror image of rail 20 shown in FIG. 2. As shown in FIG. 2, rail 20 extends in a longitudinal direction for a predetermined length. It should be noted that the longitudinal direction may refer to the direction parallel with the longitudinal direction of the truck. In some embodiments, rail 20 may include a channel 210 disposed on one side of rail 20. For example, channel 210 may be disposed at the outer side of rail 20 distant from the inner portion of compartment 14 (not shown). In some embodiments, channel 210 extends in the longitudinal direction of rail 20. In some embodiments, channel 210 is inclined outward away from the vertical direction. In this case, the inner side (adjacent to the compartment of the truck bed) of the channel 210 is higher than the outer side of channel 210, which facilitates the falling off of the precipitation on the cover 18 (not shown) attached to rail 20. In some embodiments, channel 210 may be configured to couple to cover 18. In some embodiments, channel 210 may include retaining members 212 disposed on the opposite sides thereof. In some embodiments, a fastening system (e.g. a hook and loop fastening system) may be disposed in channel 210 to secure cover 18 (not shown) in the extended configuration. In this case, a corresponding fastening system may be attached to cover 18 to fasten cover 18 to rail 20.

As shown in FIG. 2, rail 20 may include a fastening slot 220 disposed at the other side of rail 20 opposite the side where channel 210 is disposed. For example, fastening slot 220 may be disposed at the inner side of rail 20 adjacent to the inner portion of compartment 14 (not shown). In some embodiments, fastening slot 220 may extend along the longitudinal direction of rail 20. In some embodiments, fastening slot 220 may include an upper lip 222 and a lower lip 224. An opening 226 is defined between upper lip 222 and lower lip 224. In some embodiments, opening 226 has a reduced dimension compared with the dimension of the cross-section of fastening slot 220. In some embodiments, cover system 12 may include an intermediate member 230 connected between rail 20 and a cross bar 30, which will be described in detail below. Intermediate member 230 may include a body 232 inserted in fastening slot 220 and a protrusion 234 extending out of opening 226. In some embodiments, upper lip 222 and lower lip 224 retain body 232 in fastening slot 220. In some embodiments, intermediate member 230 may be fastened to rail 20 by fasteners (e.g., a bolt and a nut). In some other embodiments, intermediate member 230 and cross bar 30 may be formed as one-piece structure.

As shown in FIG. 2, cover system 12 may include cross bar 30 extending in the lateral direction. It should be noted the lateral direction may refer to the widthwise direction of truck bed 16 (not shown), and the longitudinal direction of rail 20 may parallel with the longitudinal direction of truck bed 16 (not shown). In this case, the lateral direction is perpendicular to the longitudinal direction. In some embodiments, cross bar 30 may include a fastening member 302 at one end of cross bar 30, a tenon member 306 at the other end of cross bar 30, and a bar body 304 between fastening member 302 and tenon member 306. Fastening member 302 may be fastened to protrusion 234 of intermediate member 230. For example, fastening member 302 may include two arms that sandwich protrusion 234 between them. In some embodiments, fastening member 302 may be fastened to protrusion 234 by fasteners (e.g., a bolt and a nut), not shown. In some embodiments, cross bar 30 may include tenon member 306 at the other end of cross bar 30. Tenon member 306 may be coupled to other components of cover system 12 to facilitate latching cover 18 in position.

As shown in FIG. 2, bar body 304 may include a slide slot 308 passing through bar body 304 in the longitudinal direction. In other words, slide slot 308 is formed passing through the opposite side surfaces of cross bar 30. As shown in FIG. 2, slide slot 308 extends along the lateral direction. In some embodiments, slide slot 308 includes a socket recess 310 at one end 309 of slide slot 308 adjacent to fastening member 302. In some embodiments, socket recess 310 may extend in the vertical direction of the truck bed 16 for a predetermined length. For example, socket recess 310 is lower than the rest part of slide slot 308. In operation of cover system 12, socket recess 310 provides a stop position for latching system 24 to latch to truck wall 22. In some embodiments not shown, slide slot 308 may include a plurality of socket recesses 310 that are disposed along slide slot 308 side by side and spaced apart for each other. The plurality of socket recesses 310 provides alternative stop positions for latching system 24 to accommodate different sizes of truck bed 16. In some embodiments, slide slot 308 may have a reduced width at the other end 307 of slide slot 308 adjacent to tenon member 306. In some embodiments, bar body 304 may include a rest recess 311 formed in the bottom surface of bar body 304 in the longitudinal direction. For example, the cross-section of rest recess 311 is configured to accommodate the cross-section of connecting member 326 (described below). For example, the dimension of the cross-section of rest recess 311 is equal to the dimension of the cross-section of connecting member 326. In some embodiments, the dimension of the cross-section of rest recess 311 is a little smaller than the dimension of the cross-section of connecting member 326. When connecting member 326 engage with rest recess 311, connecting member 326 and rest recess 311 may form an interference fit therebetween.

As shown in FIG. 2, cross bar 30 may include a slide channel 312 extending in the lateral direction and intersecting slide slot 308 in some embodiments. In some embodiments, slide channel 312 is opened from the bottom surface of cross bar 30 to define an opening 314. In some embodiments, slide channel 312 extends from the end face of tenon member 306 to reach as far as socket recess 310. In some other embodiments, slide channel 312 may extend laterally through the whole length of cross bar 30. In some embodiments, rest recess 311 intersects slide channel 312. In some embodiments, rest recess 311 is formed through cross bar 30 in the longitudinal direction.

As shown in FIG. 2, latching system 24 may include a saddle member 316 with two legs 318 connected by a connecting portion 317. Each leg 318 may have a hole 320 at its free end. It should be noted that saddle member 316 may include one leg. In this case, saddle member 316 is formed with a ring at one end and a plate member at the other end, where the plate member comprises hole 320. In some embodiments, the dimension of saddle member 316 in the longitudinal direction is less than the dimension of opening 314 in the longitudinal direction. That is, the length of saddle member 316 in the longitudinal direction is less than the width of slide channel 312 in the longitudinal direction. In the assembled state of latching system 24, saddle member 316 may vertically insert into opening 314 of slide channel 312 within the range of slide slot 308.

As shown in FIG. 2, latching system 24 may further include a slide member 322 (e.g., a bolt). Slide member 322 may insert into slide slot 308 in the longitudinal direction and pass through the saddle member 316 in order to make saddle member 316 rotatably ride on the slide member 322. In some embodiments, slide member 322 may include a bolt, and a nut 324 may screw on the thread portion of slide member 322. In such a case, slide member 322 may slide back and forth together with saddle member 316 within slide slot 308 in the lateral direction.

As shown in FIG. 2, latching system 24 may further include a connecting member 326. For example, connecting member 326 may include a rod. In some embodiments, connecting member 326 is rotatably coupled to leg 318 of saddle member 316. In some embodiments, connecting member 326 may have a through hole 328 at one end 327 thereof and a thread portion 330 at the other end 329 thereof. In some embodiments, the dimension of end 327 in the lateral direction is less than the dimension between legs 318 of saddle member 316 in the lateral direction. In such a case, end 327 of connecting member 326 may be sandwiched between legs 318 of saddle member 316. A bolt 332 may pass through holes 320 of saddle member 316 and hole 328 of connecting member 326. A nut 334 may screw on the thread portion of bolt 332 in order to make connecting member 326 rotate around the axis of bolt 332 in the plane defined by the longitudinal direction and the vertical direction. For example, connecting member 326 may rotate in a clockwise direction to a horizontal position. The length of leg 318 of saddle member 316 may be configured to allow connecting member 326 to engage in rest recess 311 when connecting member 326 is rotated to the horizontal position.

As shown in FIG. 2, latching system 24 may further include a clamp structure 336 coupled to end 329 of connecting member 326. In some embodiments, clamp structure 336 may include a clamp 338 and a handle 340. Clamp 338 may include a clamp lip 342 that defines a clamp slot 344.

Clamp slot 344 may be configured to receive a truck wall lip 221 of truck wall 22 and tighten against truck wall lip 221. In some embodiments, clamp 338 may include a through hole 346 to receive end 329 of connecting member 326.

As shown in FIG. 2, clamp structure 336 may further include handle 340. In some embodiments, handle 340 may include two arms 348 spaced apart from each other and defining a hollow inner portion therebetween. The upper ends of arms 348 are spaced apart from each other by a distance greater than the cross-section of connecting member 326. In the assembled configuration of latching system 24, at least thread portion 330 of connecting member 326 passes through the through hole 346 of clamp 338 and is received in the hollow inner portion between arms 348. Each arm 348 may include a through hole 350 in the longitudinal direction. A retaining pin 352 is inserted in through holes 350. Retaining pin 352 may include a through hole 354 in the vertical direction. In some embodiments, through hole 354 includes a thread that can engage thread portion 330 of connecting member 326. In the assembled configuration of latching system 24, rotation of handle 340 together with clamp 338 may move clamp 338 upward in the vertical direction such that clamp slot 344 may engage truck wall lip 221, which will be described in detail below.

In some embodiments, clamp structure 336 may move laterally back and forth within the range of slide slot 308 in the lateral direction when clamp structure 336 is coupled to cross bar 30 through connecting member 326, saddle member 316, and slide member 322. When cover system 12 is employed, slide member 322 may slide along slide slot 308 and engage in socket recess 310. Rotation of handle 340 together with claim 338, for example, in the clockwise direction, may move clamp 338 upward in the vertical direction. When cover system 12 is not employed, rotation of handle 340 together with claim 338, for example, in the counter-clockwise direction, may move clamp 338 downward. Then, one can move slide member 322 along slide slot 308 in the lateral direction and make slide member 322 rest at end 307, where connecting member 326 is aligned in the vertical direction with rest recess 311. In such a case, latching system 24 may be referred to stay in a released position. Then one can rotate clamp structure 336 together with connecting member 326 around the axis of bolt 332, for example, in the clockwise direction, to a horizontal position, where connecting member 326 engages in rest recess 311. In such a case, clamp structure 336 together with connecting member 326 may stay in the rest position. In some embodiments, a small protrusion may be formed in rest recess 311 to hold connecting member 326 within the rest recess, which will be described below. In some embodiments, additional fasteners (e.g., a bolt and a nut) may be provided to keep clamp structure 336 and connecting member 326 in the rest position. In some embodiments, clamp structure 336 and connecting member 326 can be retained in the rest position by tightening bolt 332 and nut 334 to press legs 318 of saddle member 316 against end 329 of connecting member 326 to prevent connecting member 326 and clamp structure 336 from sagging down.

Figure 3:
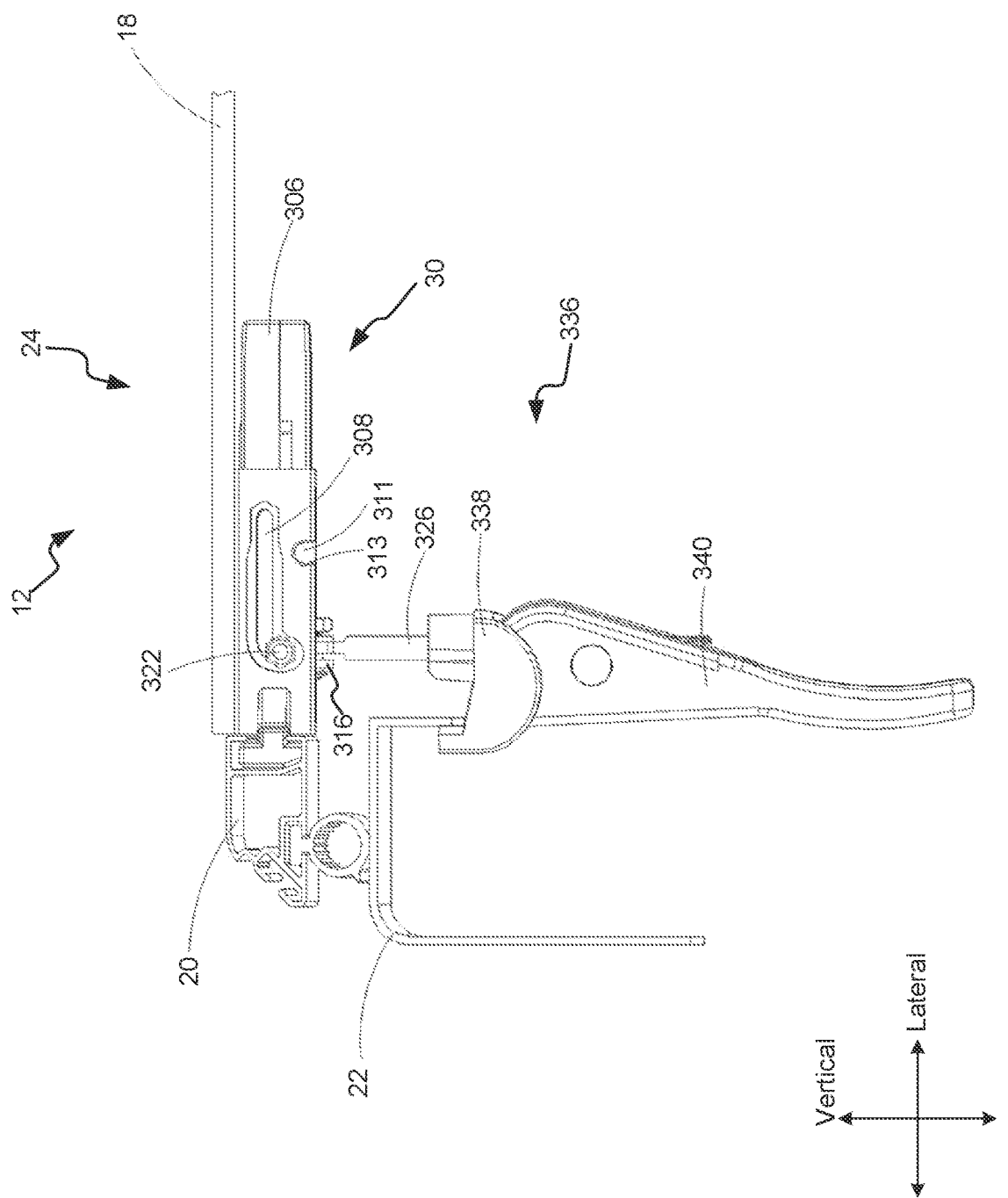
FIG. 3 is a partial perspective view of a cover system according to some embodiments of the present invention, illustrating that the latching system is kept in the latched position.

FIG. 3 is a partial elevated view of the cover system 12, illustrating that latching system 24 is kept in the latched position. As shown in FIG. 3, clamp structure 336 is coupled to cross bar 30 through connecting member 326, saddle member 316, and slide member 322. Slide member 322 moves within the range of slide slot 308 in the lateral direction and engage in socket recess 310 (shown in FIG. 2). As shown in FIG. 3, rest recess 311 may include a small protrusion 313 in some embodiments. Connecting member 326 may engage rest recess 311 when latching system 24 is kept in the rest position. In some embodiments, small protrusion 313 may prevent connecting member 326 from disengaging from rest recess 311.

Figure 4:
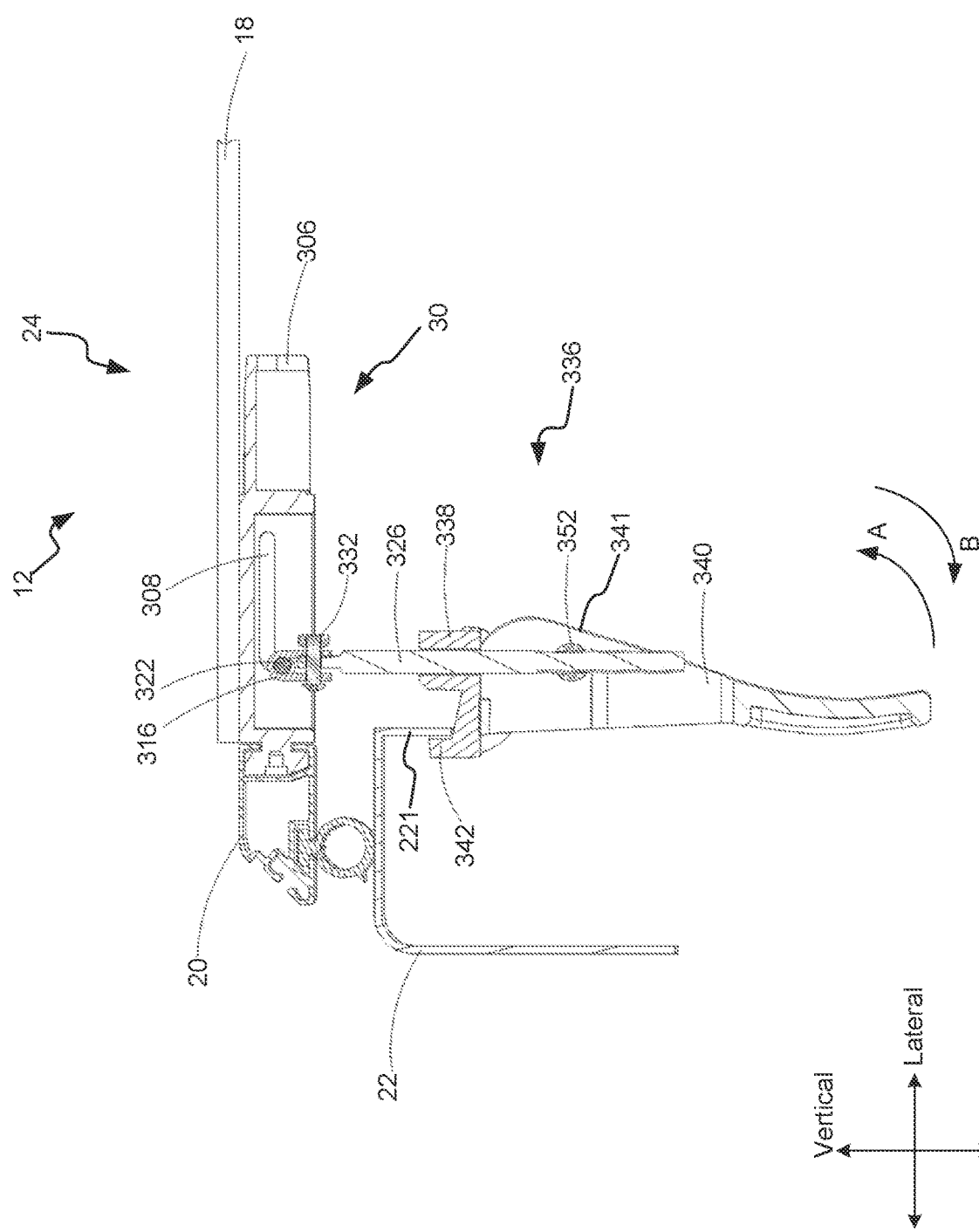
FIG. 4 is a cross section view of the cover system 12 along a vertical central plane of cross bar 30, illustrating that latching system 24 is kept in the latched position.

FIG. 4 is a cross section view of the cover system 12 along a vertical central plane of cross bar 30, illustrating that latching system 24 is kept in the latched position. As shown in FIG. 4, saddle member 316 rides on slide member 322. Bolt 332 may pass through holes 320 of saddle member 316 and hole 328 of connecting member 326 to connect slide member 322 and connecting member 326. Clamp structure 336 may pivot around the axis of connecting member 326 to move clamp 338 up and down in the vertical direction. In some embodiments, clamp 338 is coupled to handle 340 through a key slot 362 formed in clamp 338 (shown in FIG. 12) and a key 372 formed in handle 340 (shown in FIG. 11), which will be described in detail below. Before clamp lip 342 engages truck wall lip 221, the upper end of clamp lip 342 is lower than the lower end of truck wall lip 221. By pivoting handle 340 together with clamp 338, clamp 338 may move along connecting member 326 upward. In some embodiments, the distance d1 between the center of retaining pin 352 and the right side 341 of handle 340 is less than the distance d2 between the center of retaining pin 352 and the upper end of handle 340. As clamp lip 342 approaches the lower end of truck wall lip 221, handle 340 may rotate by a certain degree (for example, 30-90 degrees) counter-clockwise (as shown by arrow A in FIG. 4) around the axis of retaining pin 352 with connecting member 326 remaining in the vertical direction. Handle 340 together with clamp 338 may continue to pivot around the axis of connecting member 326 with handle 340 keeping the orientation. When the upper end of clamp lip 342 substantially flushes with the lower end of truck wall lip 221, handle 340 may be rotated clockwise (as shown by arrow B in FIG. 4) around the axis of retaining pin 352 and go back to the position in the vertical direction. Such rotation of handle 340 may push clamp 338 upward farther and make clamp lip 342 engage truck wall lip 221. When it is desired to release the engagement between clamp lip 342 and truck wall lip 221, handle 340 may be rotated around the axis of retaining pin 352 in the counter-clockwise direction (as shown by arrow A in FIG. 4) by a certain degree (for example, 30-90 degrees) with connecting member 326 remaining in the vertical direction. Clamp lip 342 may disengage from truck wall lip 221 due to the distance d1 being less than the distance d2 as described above. Then, handle 340 can be rotated around the axis of connecting member 326 together with clamp 338 to make handle 340 and clamp 338 moving downward. After the upper end of clamp lip 342 is lower than the lower end of truck wall lip 221, sliding member 322 may disengage from socket recess 310 (shown in FIG. 2) by simply moving upward the assembly including sliding member 322, connecting member 326, clamp 338, and handle 340. Then, sliding member 322 may move laterally within slide slot 308 together with connecting member 326, clamp 338, and handle 340.

Figure 5:
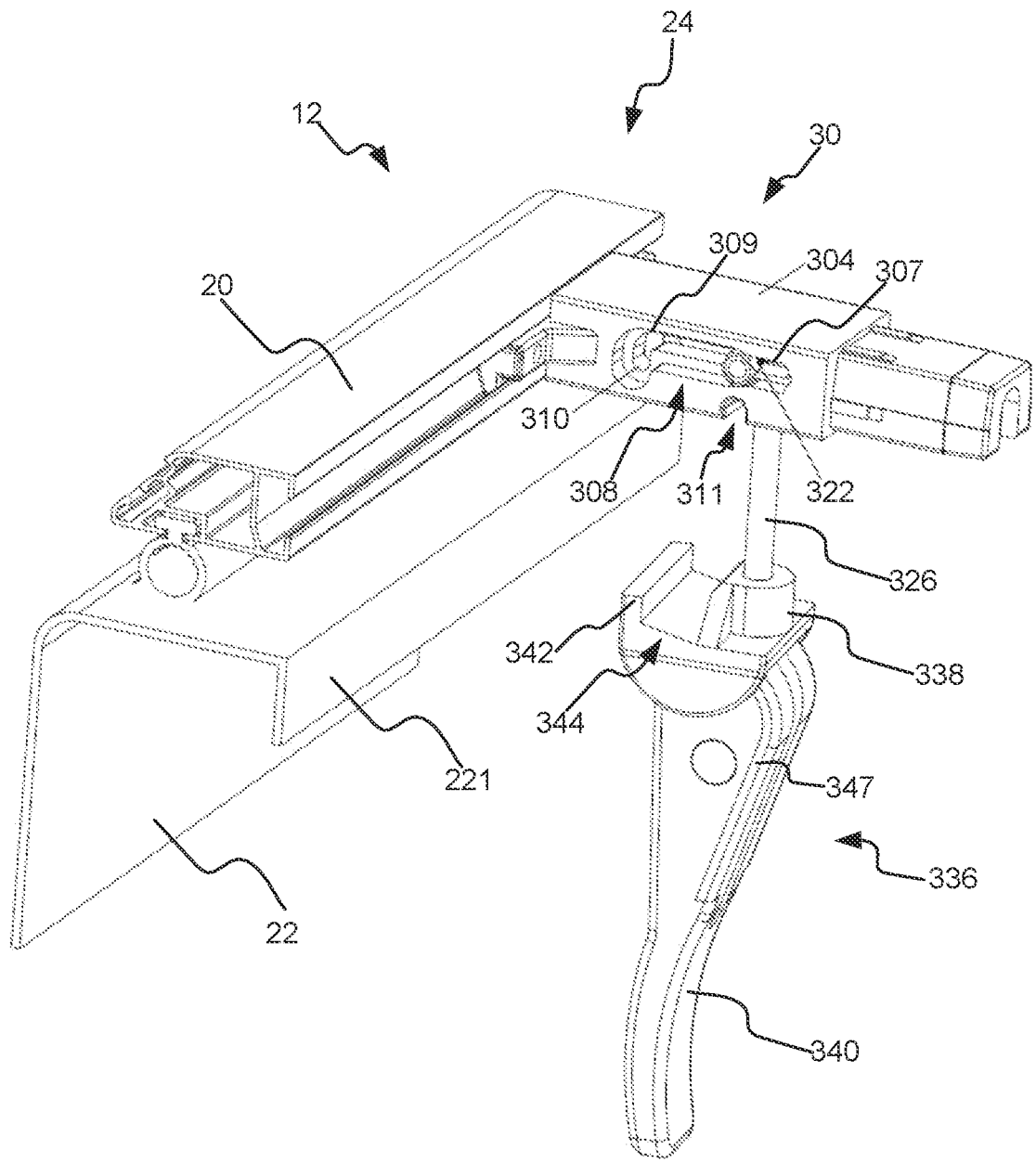
FIG. 5 is a partial perspective view of cover system, illustrating that latching system is kept in the released position.

FIG. 5 is a partial perspective view of cover system 12, illustrating that latching system 24 is kept in the released position. As shown in FIG. 5, clamp structure 336 is coupled to slide member 322 through connecting member 326 and saddle member 316 (not shown). Clamp slot 344 has been released from truck wall lip 221 of truck wall 22 by rotation of handle 340. Slide member 322 slides along slide slot 308 to end 307 such that connecting member 326 is aligned with rest recess 311 in the vertical direction. In this configuration, clamp structure 336 together with connecting member 326 may be rotated in the clockwise direction around the axis of bolt 332 (shown in FIG. 2) until connecting member 326 engages in rest recess 311.

FIG. 6 is an elevated view of cover system 12, illustrating latching system 24 be positioned at a released position. As shown in FIG. 6, handle 340 and clamp 338 may rotate around the axis of connecting member 326 to make clamp lip 342 positioned in the lateral direction. In other words, clamp structure 336 has been pivoted around the axis of connecting member 326 in the clockwise direction by 90 degrees. After clamp 338 has been rotated by 90 degrees, the profile of clamp structure 336 in the vertical direction is reduced when clamp structure 336 is rotated to the horizontal position. It facilitates the clamp structure 336 to occupy a smaller space to prevent obstruction from accessing compartment 14 (not shown) of truck bed 16 (not shown). In some embodiments, clamp 338 may include a wing plate 343 at either side of clamp 338 as shown in FIG. 6. A protrusion 345 is disposed at one end of wing plate 343. For example, protrusion 345 may be disposed at the lower end of wing plate 343 as shown in FIG. 6. In some embodiments, a flange 347 may be disposed at either side of handle 340 (also shown in FIG. 5) along at least the upper portion of the peripheral of handle 340. Protrusion 345 of clamp 338 may slide along flange 347 of handle 340 as handle 340 rotate around the axis of retaining pin 352. The engagement between protrusion 345 and flange 347 may facilitate to keep clamp 338 move up and down along connecting member 326 and prevent clamp 338 from disengaging with handle 340. In some embodiment, key 372 is disposed on the upper end of handle 340, and a corresponding key slot 362 is formed at the bottom of clamp 338. The structure details of key 372 and that of key slot 362 will be described below. In some embodiments, key slot 362 is formed perpendicular to the extending direction of clamp lip 342. When clamp lip 342 engages truck wall lip 221 by rotating handle 340 together with clamp 338 along the clockwise direction (shown by arrow B in FIG. 4), the engagement between key 372 and key slot 362 may push clamp lip 342 against truck wall lip 221 and prevent clamp lip 342 from disengaging from truck wall lip 221, as shown in FIG. 4.

Figure 7:
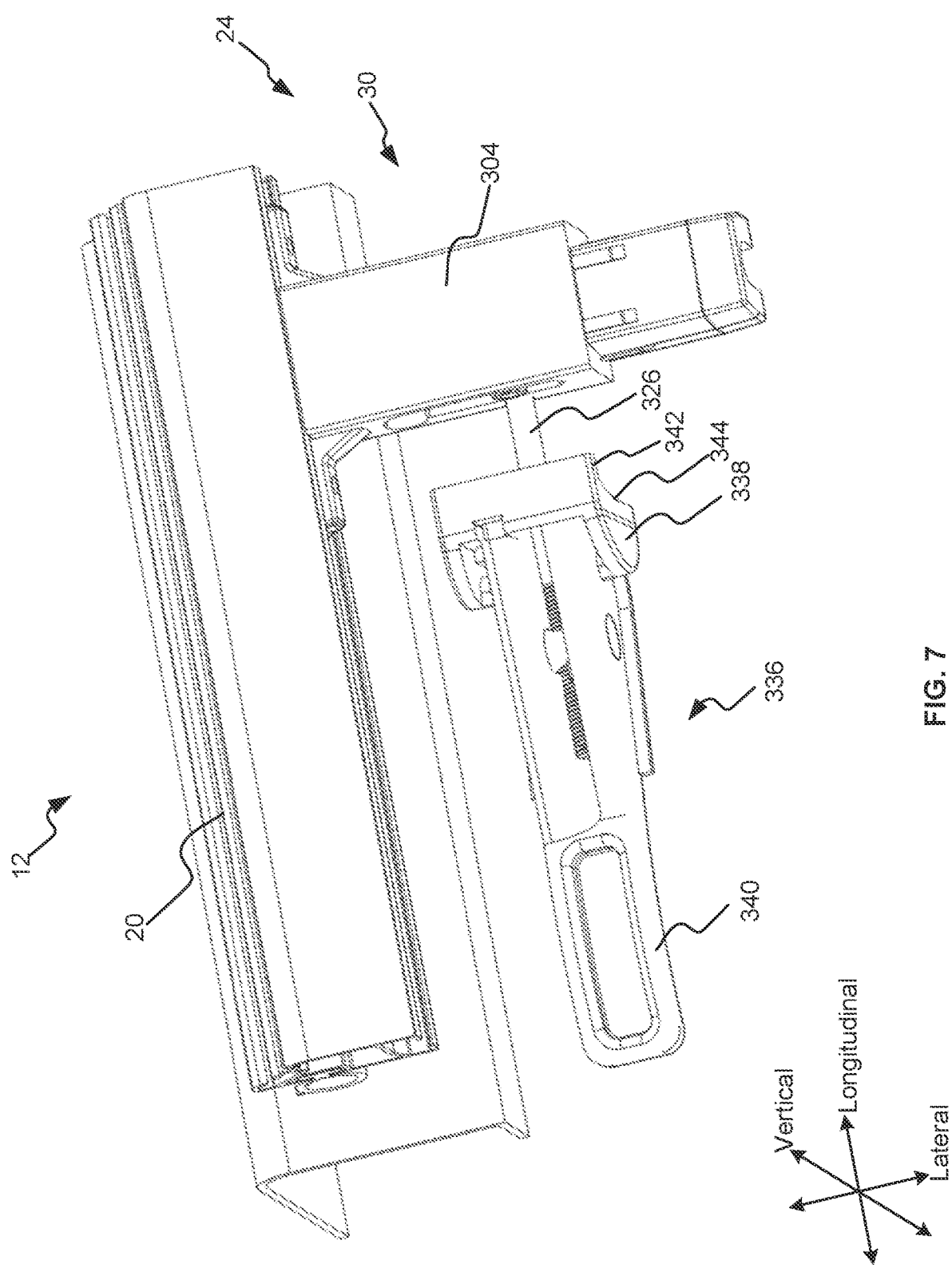
FIG. 7 is a partial perspective view of cover system, illustrating that latching system is positioned in the rest position.

FIG. 7 is a partial perspective view of cover system 12, illustrating that latching system 24 is positioned in the rest position. As shown in FIG. 7, clamp structure 336 is coupled to slide member 322 (not shown) through connecting member 326 and saddle member 316 (not shown). As shown in FIG. 7, clamp structure 336 together with connecting member 326 may be rotated in the clockwise direction around the axis of slide member 322 (shown in FIG. 6) until connecting member 326 engages in rest recess 311 (shown in FIG. 6). In some embodiments, rest recess 311 may include small protrusion 313, as shown in FIG. 6. Connecting member 326 may engage rest recess 311 when latching system 24 is kept in the rest position. In some embodiments, small protrusion 313 may prevent connecting member 326 from disengaging from rest recess 311.

Figure 8:
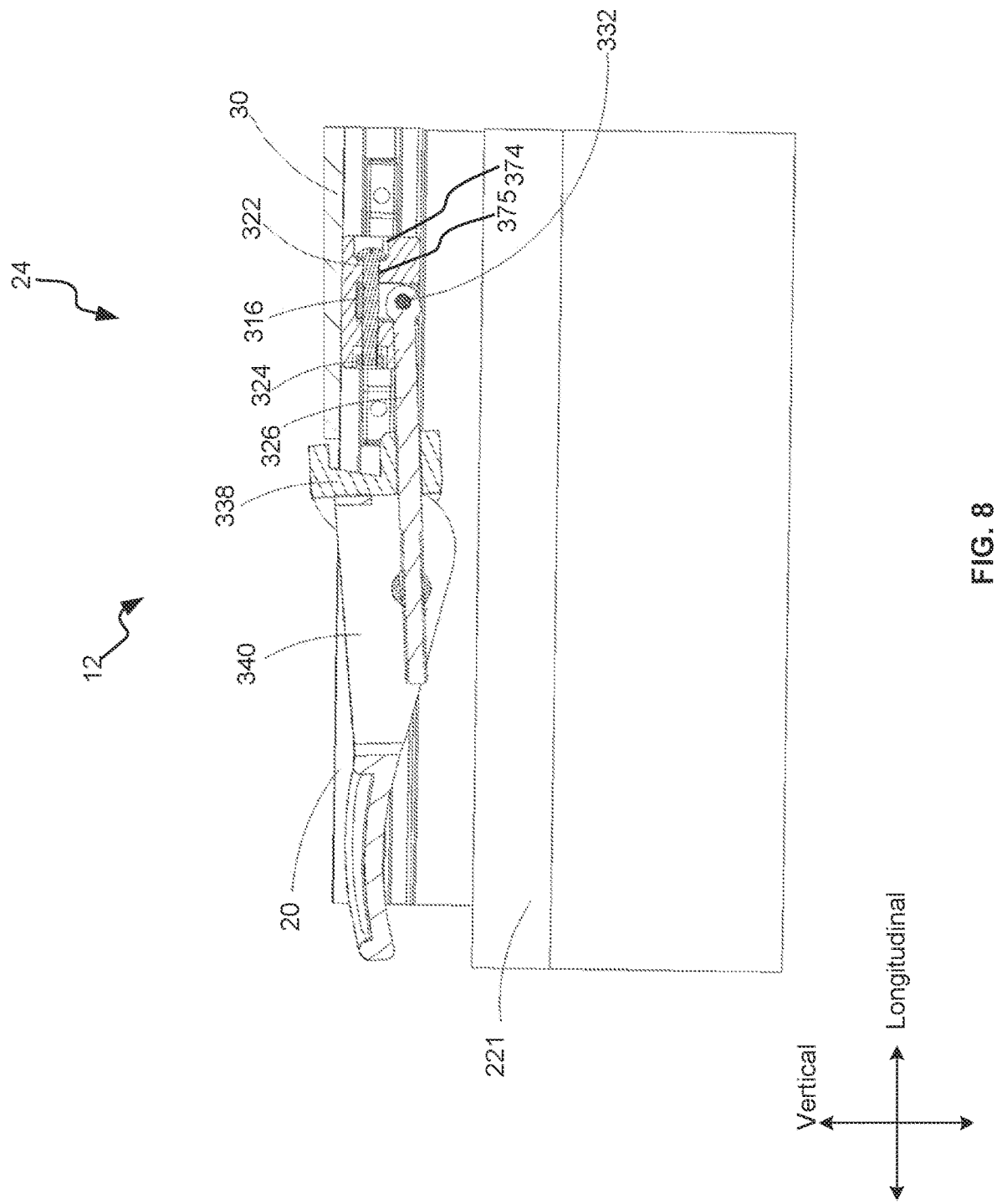
FIG. 8 is an elevated cross section view of cover system, illustrating that latching system is positioned in the rest position.

FIG. 8 is an elevated cross-section view of cover system 12, illustrating that latching system 24 is positioned in the rest position. As shown in FIG. 8, handle 340, clamp 338, and connecting member 326 are positioned substantially in the longitudinal direction and occupy reduced space to prevent interference with compartment 14 (not shown). Due to the engagement of small protrusion 313 (not shown) with connecting member 326, handle 340 and clamp 38 would not fall off the rest position caused by the gravity of themselves or shock occurred during driving of the truck.

Figure 9:
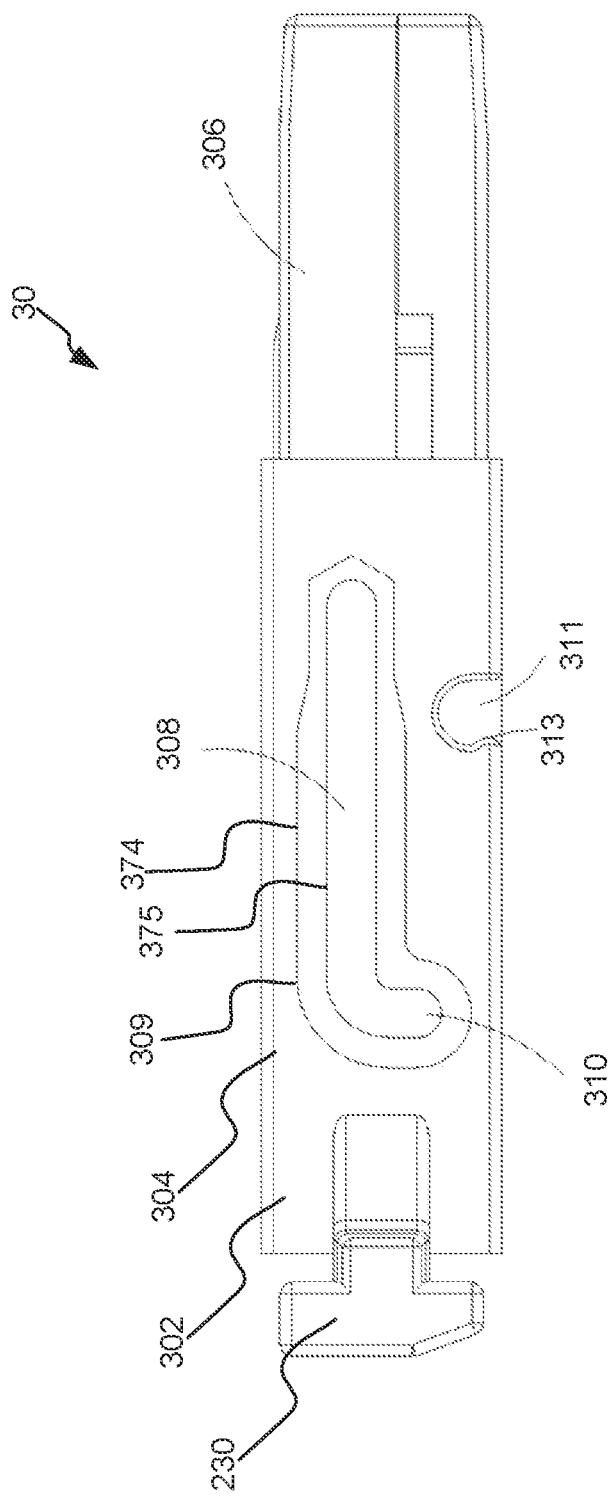
FIG. 9 is an elevated view of the cross bar according to some embodiments of the present invention.

FIG. 9 is an elevated view of cross bar 30 according to some embodiments of the present invention. As shown in FIG. 9, bar body 304 may include slide slot 308 passing through bar body 304 in the longitudinal direction. In some embodiments, slide slot 308 includes socket recess 310 at one end 309 of slide slot 308 adjacent to fastening member 302. In some embodiments, bar body 304 may include rest recess 311 formed in the bottom surface of bar body 304 in the longitudinal direction. In some embodiments, rest recess 311 may include small protrusion 313. In some embodiments, intermediate member 230 and cross bar 30 may be formed as one-piece structure. In such embodiments, the structural strength of cross bar 30 is improved. However, it is not necessary for intermediate member 230 and cross bar 30 to be formed as one-piece.

Figure 10:
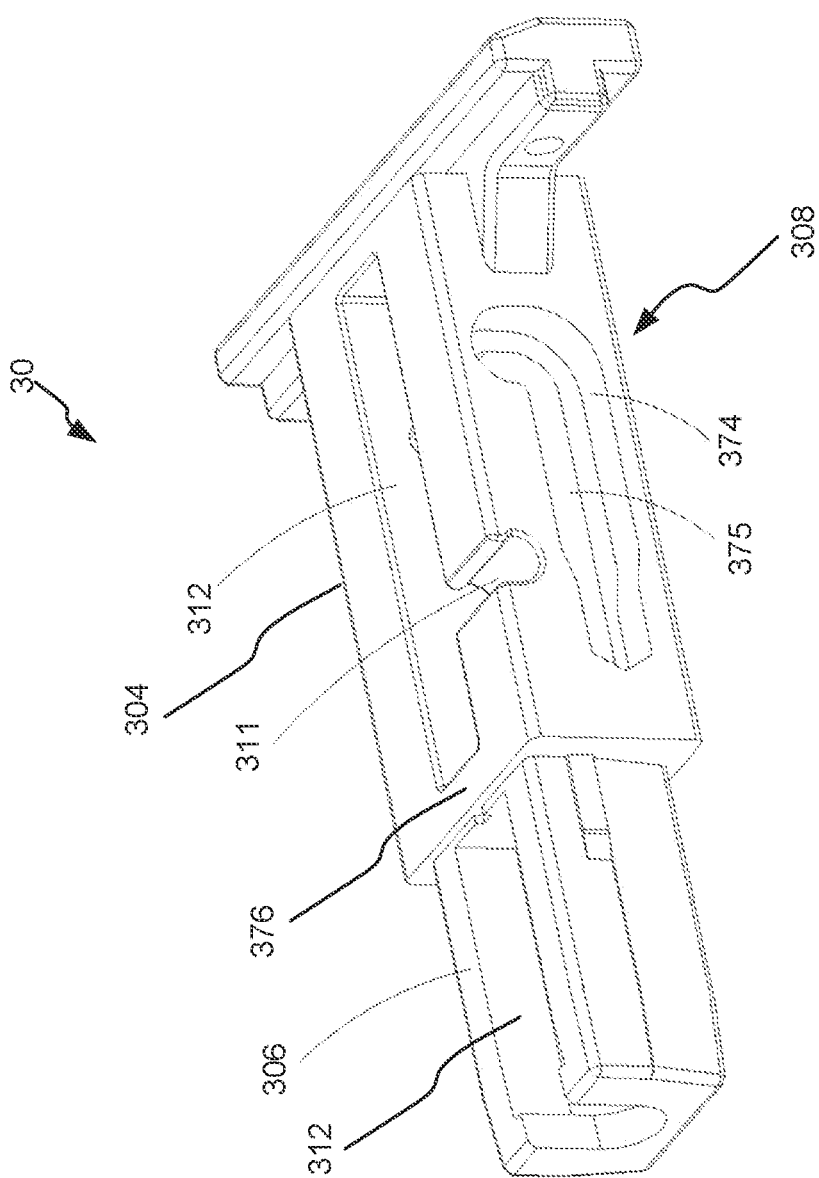
FIG. 10 is a perspective view of the cross bar according to some embodiments of the present invention.

FIG. 10 is a perspective view of cross bar 30 according to some embodiments of the present invention. As shown in FIG. 10, cross bar 30 is shown upside down. In some embodiments, slide slot 308 may include an outer slot 374 and an inner slot 375 at either side. In some embodiments, outer slot 374 may have a cross section larger than that of inner slot 375. The outer slot 374 may provide accommodating space for nut 324 and the head of sliding member 322, as shown in FIG. 8. In some embodiments, slide channel 312 may not pass through tenon member 306 and bar body 304. Instead, a spacer 376 is disposed at the interface between tenon member 306 and bar body 304.

Figure 11:
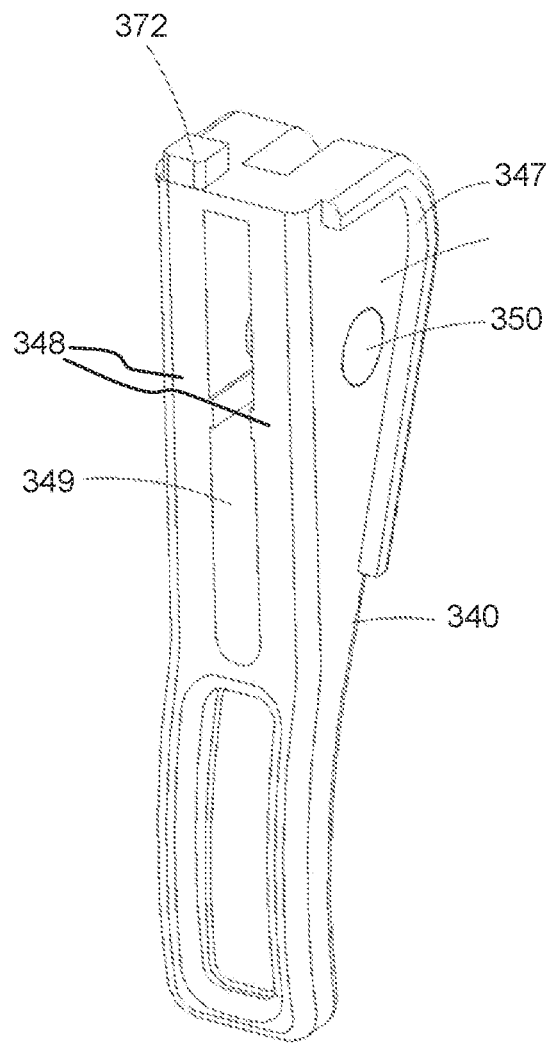
FIG. 11 is a perspective view of the handle according to some embodiments of the present invention.

FIG. 11 is a perspective view of handle 340 according to some embodiments of the present invention. As shown in FIG. 11, handle 340 may include key 372 disposed on the upper end thereof. In some embodiments, key 372 may engage with key slot 362 (shown in FIG. 6) formed at the bottom of clamp 338. In some embodiments, handle 340 may include a flange 347 disposed at either side of handle 340 (also shown in FIG. 5) along at least the upper portion of the peripheral of handle 340. Protrusion 345 of clamp 338 may slide along flange 347 of handle 340 as handle 340 rotate around the axis of retaining pin 352, as shown in FIG. 6. In some embodiments, handle 340 may include two arms 348 spaced apart from each other and defining a hollow inner portion 349 therebetween. In some embodiments, the width of inner portion 349 is greater than the cross-section of connecting member 326 to allow connecting member 326 may swing out of inner portion 349 when handle 340 rotate around the axis of retaining pin 352, as described above referring to FIG. 4.

Figure 12:
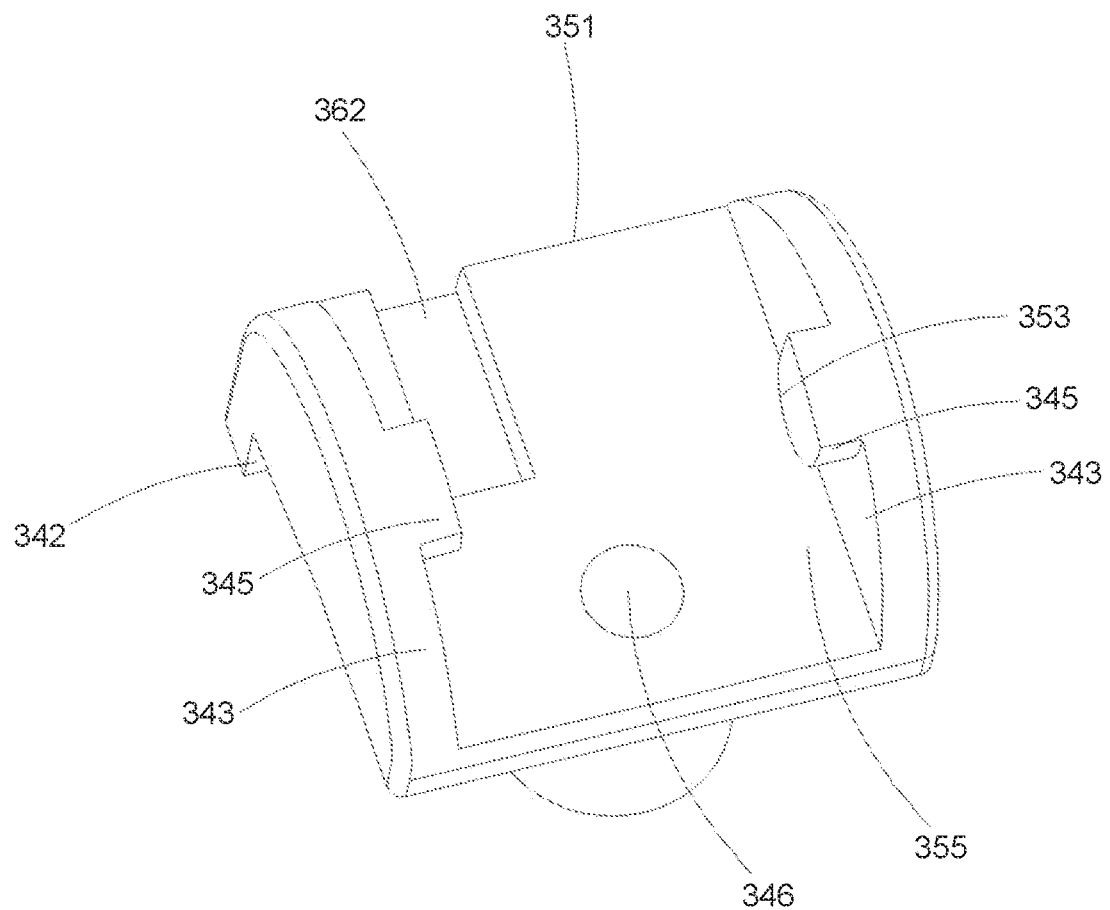
FIG. 12 is a perspective view of the clamp according to some embodiments of the present invention, illustrating the clamp is positioned upside down.

FIG. 12 is a perspective view of clamp 338, illustrating clamp 338 is positioned upside down. As shown in FIG. 12, clamp 338 may include key slot 362 that may engage with key 372 disposed on handle 340 as shown in FIG. 11. In some embodiments, key slot 362 opens at the inner side 351 of clamp 338 where clamp lip 342 extends from clamp 338. In some embodiments, key slot 362 may have a blind end that engages with key slot 362 to push clamp 338 away from truck wall lip 221 when clamp lip 342 engages truck wall lip 221, as described above referring to FIG. 4. In some embodiments, clamp 338 may include wing plate 343 at either side. Wing plates 343 extend vertically from the bottom 355 of clamp 338. Protrusion 345 is formed at the lower end of wing plate 343. In some embodiments, protrusion 345 may slide along flange 347 of handle 340 as handle 340 rotate around the axis of retaining pin 352, as shown in FIG. 6. The engagement between protrusion 345 and flange 347 may facilitate to keep clamp 338 move up and down along connecting member 326 and prevent clamp 338 from disengaging with handle 340. In some embodiment, protrusion 345 may include a round contour 353 to facilitate protrusion 345 slide along flange 347 of handle 340.

While the above is a full description of the specific embodiments, various modifications, alternative constructions and equivalents may be used. Therefore, the above description and illustrations should not be taken as limiting the scope of the present disclosure which is defined by the appended claims.

What is claimed is:

1. A truck cover system, comprising:
a rail extending in a longitudinal direction, wherein the rail defines a channel configured to couple to a cover;
a cross bar extending in a lateral direction that is perpendicular to the longitudinal direction, wherein the cross bar is coupled to the rail, and the cross bar comprises:
a slide slot passing through opposite side surfaces of the cross bar and extending along the lateral direction;
a slide channel formed in a bottom surface of the cross bar, wherein the slide channel extends in the lateral direction and intersects the slide slot; and
a latching system coupled to the cross bar, wherein the latching system comprises:
a slide member passing through the slide slot and is slidable within the slide slot;
a saddle member rotatably riding on the slide member, wherein the saddle member comprises at least one leg;
a connecting member having a first end and a second end, wherein the first end of the connecting member is rotatably coupled to the leg of the saddle member; and
a clamp structure coupled to the second end of the connecting member.

2. The truck cover system of claim 1, wherein the slide slot comprises a socket recess at one end thereof, wherein the socket recess extends in a vertical direction for a predetermined length.

3. The truck cover system of claim 2, wherein the slide slot comprises a plurality of socket recesses disposed side by side and spaced apart from each other.

4. The truck cover system of claim 1, wherein the cross bar further comprises a rest recess formed in the bottom surface, wherein the rest recess extends in the longitudinal direction and intersects the slide channel.

5. The truck cover system of claim 4, wherein a dimension of a cross-section of the rest recess is configured to equal to or less than a dimension of a cross-section of the connecting member.

6. The truck cover system of claim 4, wherein the rest recess extends through the cross bar in the longitudinal direction.

7. The truck cover system of claim 4, wherein the cross bar comprises a plurality of rest recesses disposed side by side and spaced apart from each other.

8. The truck cover system of claim 1, wherein the saddle member comprises two legs are connected by a connecting portion, wherein free ends of the two legs rotatably coupled to the first end of the connecting member by a bolt.

9. The truck cover system of claim 8, wherein each free end of the two legs comprises a first through hole, and the bolt passes through the first through holes.

10. The truck cover system of claim 9, wherein the first end of the connecting member comprises a second through hole, wherein the first end of the connecting member is sandwiched between the free ends of the two legs of the saddle member with the bolt passing through the second through hole.

11. The truck cover system of claim 10, wherein the second end of the connecting member comprises a thread portion coupled to the clamp structure.

12. The truck cover system of claim 11, wherein the clamp structure comprises a clamp and a handle, wherein the clamp comprises a clamp lip coupled to a truck wall lip of a truck wall and a third through hole extending in a vertical direction, wherein the second end of the connecting member passes through the third through hole.

13. The truck cover system of claim 12, wherein the handle comprises two arms spaced apart from each other and defining a hollow inner portion therebetween.

14. The truck cover system of claim 13, wherein each arm of the handle comprises a fourth through hole extending in the longitudinal direction, and the latching system comprises a retaining pin passing through the fourth through holes.

15. The truck cover system of claim 14, wherein the retaining pin comprises a thread hole extending in the vertical direction and receiving the thread portion of the second end of the connecting member.

16. The truck cover system of claim 1, wherein the slide member comprises a bolt and a nut coupled with the bolt.

17. The truck cover system of claim 1, wherein the connecting member comprises a rod.

18. The truck cover system of claim 1, wherein the cross bar comprises a fastening member at one end, a tenon member at the other end, and a bar body between the fastening member and the tenon member, wherein the slide slot is formed in the bar body.

19. The truck cover system of claim 18, further comprising an intermediate member coupled between the rail and the cross bar.

20. The truck cover system of claim 19, wherein the rail comprises a fastening slot formed at one side thereof, and a portion of the intermediate member is retained in the fastening slot.

* * * * *